United States Patent [19]
Frisch

[11] Patent Number: 4,690,354
[45] Date of Patent: Sep. 1, 1987

[54] GEOSTATIONARY COMMUNICATIONS SATELLITE

[75] Inventor: Eberhard Frisch, Unterhaching, Fed. Rep. of Germany

[73] Assignee: Messerschmitt-Boelkow-Blohm Gesellschaft mit beschraenkter Haftung, Munich, Fed. Rep. of Germany

[21] Appl. No.: 859,147

[22] Filed: May 2, 1986

[30] Foreign Application Priority Data

May 10, 1985 [DE] Fed. Rep. of Germany ....... 3516811

[51] Int. Cl.$^4$ .............................................. B64G 1/10
[52] U.S. Cl. ............................................... 244/158 R
[58] Field of Search ............ 244/158 R, 173; 455/12; 342/352, 356

[56] References Cited

U.S. PATENT DOCUMENTS 1,393,820 10/1921 Osborne ................................ 244/49

FOREIGN PATENT DOCUMENTS 2517626 6/1983 France ............................ 244/158 R

OTHER PUBLICATIONS

"The Impact of Space Shuttle on the Future of Communication Satellites", Dr. Albert D. Wheelon, presented to the Telecommunications Assoc., Tokyo, Japan, 9 Nov. 78.

"The SBS Communication Satellite-An Integrated Design", H. A. Rosen, presented to Conference: EASCON '78, Arlington, Va., 25-27, Sep. 1978.

"Elimination of Cross Polarization in Offset Dual Reflector Antennas", Hirokazu Tanaka, et al., Electronics and Comms. in Japan, vol. 58-B, No. 12, 1975.

ESA Bulletin 38, May 1984, pp. 12-16.

The Bell System Technical Journal, vol. 57, No. 7, pp. 2663-2684, Sep. 1978.

*Primary Examiner*—Jeffrey V. Nase
*Assistant Examiner*—Rodney Corl
*Attorney, Agent, or Firm*—W. G. Fasse; D. H. Kane, Jr.

[57] ABSTRACT

A geostationary sun oriented communications satellite has an operational module with a payload platform rotating at one r.p. day. The antenna components are mounted on the platform. The antenna components are so oriented relative to each other and to the platform that an efficient folding and unfolding is possible without any complicated mechanism.

8 Claims, 1 Drawing Figure

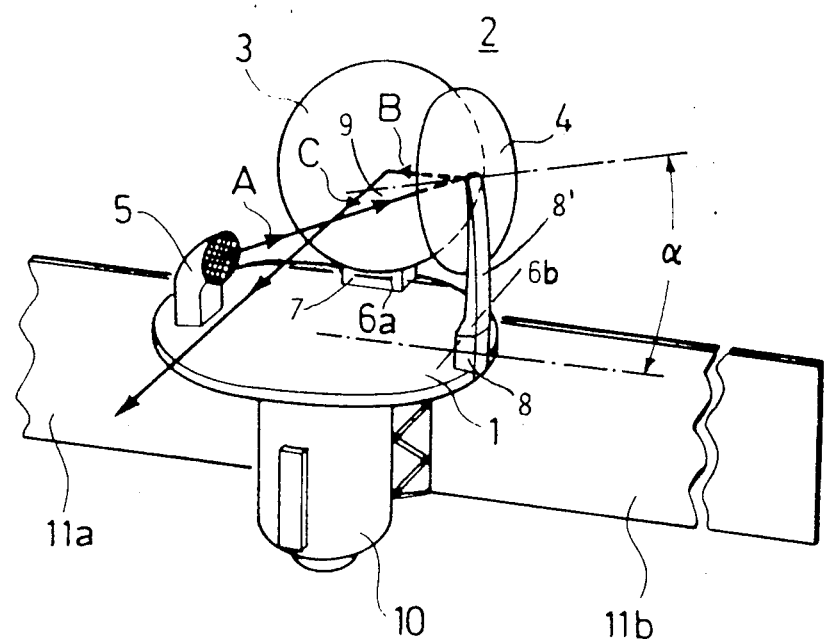

GEOSTATIONARY COMMUNICATIONS SATELLITE

FIELD OF THE INVENTION

The invention relates to a sun-oriented geostationary communications satellite. Such satellites include an operational module with unfoldable and not rotatable solar cell arrays oriented toward the sun in the operational position. A payload carrying platform is rotatable relative to the operational module and carries primary radiator and reflector means. The reflector means are foldable.

DESCRIPTION OF THE PRIOR ART

Sun oriented communications satellites are known. Reference is made in this respect to ESA-Bulletin 38; May 1984, pages 12 to 16, referring to an article entitled "A Sun-Pointing Communications Satellite" by U. Renner and J. Nauck. The satellite has a payload platform rotatable relative to the satellite body or module. A directional radio transmitter antenna arrangement is mounted on the payload platform. The reflector of the antenna is mounted in a foldable manner. This rather simple type of construction of an offset antenna has, however, the disadvantage of relatively large deformations of the outer spot beams, especially when such an offset antenna is used as a multispot beam antenna. The deformations of the outer spot beams result in a lifting, so to speak, of the side lobes, whereby relatively high cross polar wave components occur.

A further offset multireflector antenna is described in an article entitled "Offset Multireflector Antennas With Perfect Pattern Symmetry and Polarization Discrimination" by C. Dragone, published in "The Bell System Technical Journal", Volume 57, No. 7, September 1978, pages 2663 to 2684. This antenna according to Dragone satisfies the requirement for radiating the wave front in a plane, thereby providing a more limited cross polar wave component. Accordingly, the antenna of Dragone reduces the disadvantages of the offset antenna. However, the antenna according to Dragone has the disadvantage that its subreflector has a size corresponding approximately to the size of the main reflector. Therefore, prior art communications satellites have used subreflectors which are substantially smaller than the main reflector. Such a construction does achieve a certain reduction in the cross polar wave component. However, there is room for improvement.

OBJECTS OF THE INVENTION

In view of the foregoing it is the aim of the invention to achieve the following objects singly or in combination:

to provide a geostationary, sun oriented communications satellite equipped with an antenna arrangement in such a way that the use of multispot beam reflectors having optimally small cross polar wave components becomes possible;

to achieve smaller spot beam degradations of all kinds, and to make the subreflector of approximately the same size as the main reflector;

to avoid the need for complicated unfolding and folding mechanisms for the antenna reflector structure so that for the main reflector and for the subreflector only a simple tilting about one respective axis becomes necessary for the folding or unfolding to thereby also avoid complicated translational movements of the antenna components; and to arrange all components on the platform in such a manner that a compact structure is achieved, especially when the antenna reflectors are in the folded down position for launching.

SUMMARY OF THE INVENTION

The satellite according to the invention has a primary radiator and reflector arrangement mounted on the rotatable payload platform having one mounting surface, wherein the antenna arrangement has a main reflector and a subreflector which are, preferably, of approximately the same size. The reflectors and at least one primary radiator are so arranged that their main beams define a plane which is located at an angle $\alpha$ relative to the reference plane defined by the rotatable platform. The angle $\alpha$ is preferably within the range of 10 20 to 30° for an optimal compact arrangement, as well as for a simple folding and unfolding of the reflectors.

The mounting means for the reflectors comprise journal bearings, each of which has but one journalling axis and the journalling axes of both journal bearings extend approximately in parallel to the plane of the payload carrying platform, whereby in the folded condition one reflector is located between the platform mounting surface and the other reflector.

Preferably, the subreflector and the main reflector form a stack in their folded condition in the rocket. The unfolding into the operational position takes place sequentially.

BRIEF DESCRIPTION OF THE DRAWING

In order that the invention may be clearly understood, it will now be described, by way of example, with reference to the single figure of the accompanying drawing showing a perspective view of a sun oriented, geostationary communications satellite according to the invention.

DETAILED DESCRIPTION OF A PREFERRED EXAMPLE EMBODIMENT AND OF THE BEST MODE OF THE INVENTION

The satellite comprises an operational module 10 carrying unfoldable solar cell arrays 11a and 11b shown in the unfolded condition. In this operational condition the satellite is so oriented, that the arrays 11a, 11b always face the sun in the geostationary orbit of the satellite. A payload carrying platform 1 having one mounting surface defining a reference plane, is rotatably mounted to the module 10. The platform 1 is rotated by conventional drive means not shown, but so arranged that the antenna system 2 comprising a main reflector 3 and a subreflector 4, is always oriented toward the earth in a geostationary manner. For this purpose the platform 1 performs one full revolution within twenty-four hours relative to the module 10.

The platform 1 carries in addition to the main reflector 3 and the subreflector 4 a primary radiating array 5 for producing multispot beams. The main reflector 3 is mounted to the platform 1 by a journal bearing 7 having a single journal axis 6a extending approximately in parallel to a first or reference plane defined by the platform 1. The subreflector 4 is mounted on the platform 1 by a journal bearing 8 also having a single journal axis 6b and carrying the subreflector 4 by an arm 8'. The journal axis 6b also extends approximately in parallel to the first plane defined by the platform 1. As shown in the drawing, the axes 6a and 6b extend at a right angle to each other.

According to the invention the radiating array 5, the main reflector 3, and the subreflector 4 are arranged relative to each other so that their respective main beams A, B, C, define a second plane 9 which extends at an angle α relative to the first or reference plane defined by the platform 1. This angle α is preferably within the range of 10° to 30° for an optimal compact arrangement of the components 3, 4, and 5. Thus, even if the subreflector 4 has a size approximately corresponding to the size of the main reflector 3, a very compact antenna arrangement 2 results because the radiating array 5 of the primary transmitter requires a very short connection conductor and because the reflectors 3 and 4 can be mounted on relatively short arms, one of which is shown at 8'.

The angle α is selected so that on the one hand the primary radiating array 5 can be located as close as possible to the platform 1 and so that the subreflector 4 on its arm 8' can be dimensioned so that in its folded or transport position it will not project outside the platform 1. One of the two journal axes 6a or 6b may be spaced closer from the surface of the platform 1 than the other, whereby the respective reflector will be folded first and the reflector with the journal axis having a larger spacing from the platform 1 will be folded next. As shown, the reflector 3 will be folded first and the reflector 4 will then be folded to form a stack. The reflector 4 will first be unfolded and then the reflector 3 will be unfolded. The reflectors are folded for the launching and only after the separation of the launching rocket will the unfolding be performed.

An arrangement as disclosed herein has the advantage that, depending on the intended use, a single primary radiator 5 or an entire area of several such radiating elements may be used in order to utilize the excellent characteristics of such a reflector system. Further, the mounting of the reflectors with single axis journal bearings results in a high reliability as compared to systems using multiaxes bearings and translatory unfolding mechanisms. Such complicated unfolding mechanisms translatory linkage systems are unnecessary, especially when the satellite is to be transported in the lower stage of a double stage rocket, because in that instance the available storage space above the satellite is very limited. Contrary thereto, according to the invention the space needed above the platform 1 requires a very small dimension perpendicularly to the platform 1 while nevertheless not requiring any complicated unfolding mechanism.

Although the invention has been described with reference to specific example embodiments, it will be appreciated, that it is intended to cover all modifications and equivalents within the scope of the appended claims.

What we claim is:

1. A sun-oriented geostationary communications satellite, comprising an operational module including unfoldable solar cell arrays directable toward the sun and payload carrier means directable toward the earth, said payload carrier means having a platform (1) defining a first reference plane, antenna means, means for foldably mounting said antenna means on said platform so that said antenna means are tiltable between a folded position and an operating position, said antenna means including a main reflector (3) and a subreflector (4), both said reflectors having approximately the same size, primary radiator means (5) operatively mounted on said platform (1), said primary radiator means, said main reflector, and said subreflector being oriented relatve to each other in said operating position so that respective beams define a second plane oriented at an angle (α) relative to said first reference plane, said angle (α) being sufficiently small for permitting folding said main reflector and said subreflector into a compact package, said mounting means comprising only one folding axis for said main reflector and only one folding axis for said subreflector for folding both said reflectors into a position substantially in parallel to said reference plane and substantially in parallel to each other, whereby in the folded condition one of said reflectors is located between said platform and the respective other reflector.

2. The satellite of claim 1, wherein said angle (α) is within the range of 10° to 30°.

3. The satellite of claim 1, wherein said means for foldably mounting said main reflector and said subreflector comprise two journal bearings (7, 8), having a single journal axis forming said folding axis for said main reflector and a single journal axis forming said folding axis for said subreflector respectively, said journal axes extending approximately in parallel to said first platform reference plane.

4. The satellite of claim 3, wherein said journal axes have different spacings from said first platform reference plane so that both of said reflectors can be folded toward the same side of said platform into said folded position in which one reflector is located on top of the other reflector, and so that said reflectors can be folded sequentially back into said operating position.

5. The satellite of claim 4, wherein said reflectors have about the same diameters, wherein the reflector having the journal axis with the smaller spacing from said reference plane is first folded toward said platform, and wherein the reflector having the journal axis with the larger spacing from said reference plane is then folded onto the already folded reflector, whereby the last folded reflector is to be unfolded first.

6. The satellite of claim 1, wherein said platform (1) has one mounting surface defining said reference plane, said mounting means mounting said main reflector (3) and said subreflector (4) on said one mounting surface.

7. The satellite of claim 6, wherein said primary radiator means (5) are also mounted on said one mounting surface.

8. The satellite of claim 6, wherein said folding axes extend substantially at a right angle to each other.

* * * * *